United States Patent [19]
Kim

[11] Patent Number: 5,159,464
[45] Date of Patent: Oct. 27, 1992

[54] SYNCHRONIZATION HOLDING CIRCUIT IN SCANNING OF LASER DISK PLAYER

[75] Inventor: Young H. Kim, Suweon, Rep. of Korea

[73] Assignee: Samsung Electronics Co., Ltd., Suweon, Rep. of Korea

[21] Appl. No.: 636,118

[22] Filed: Dec. 31, 1990

[30] Foreign Application Priority Data
May 22, 1990 [KR] Rep. of Korea ............... 90-7356

[51] Int. Cl.$^5$ ............................................. H04N 5/95
[52] U.S. Cl. ................................. 358/338; 358/326; 358/314; 358/327
[58] Field of Search ............ 358/338, 337, 348, 137, 358/148, 342, 343, 335, 310, 312, 314, 318, 319, 321, 327, 323, 324, 336, 322, 326; 360/19.1, 38.1, 73.01, 73.03

[56] References Cited
U.S. PATENT DOCUMENTS
4,315,276  2/1982  Harada et al. .................... 358/8
4,959,733  9/1990  Miura et al. .................... 358/338

Primary Examiner—Dale M. Shaw
Assistant Examiner—Robert Chevalier
Attorney, Agent, or Firm—Cushman, Darby & Cushman

[57] ABSTRACT

A synchronization holding circuit in scanning of a laser disk comprising a signal detection circuit, a signal processing circuit, an error detection circuit, a speed control circuit, a locking detection circuit, a microcomputer, and a switching circuit, wherein a user can get information on a location of a currently scanned laser disk by displaying a video signal on a monitor only when the horizontal synchronous signals and phase horizontal synchronous signals of the video signal are synchronized simultaneously and also an eyestrain phenomenon can be removed.

3 Claims, 2 Drawing Sheets

SYNCHRONIZATION HOLDING CIRCUIT IN SCANNING OF LASER DISK PLAYER

BACKGROUND OF THE INVENTION

The present invention relates to a laser disk player and, more particularly, to a synchronization holding circuit used in scanning within a laser disk player which holds coincidentally the synchronization of each line during a scan mode. The laser disk player is classified as a constant linear velocity (hereinafter, referred to as CLV) system and a constant angular velocity (hereinafter, referred to as CAV) system according to methods of recording video and audio information onto a laser disk.

In the CAV system, the same amount of video and audio information are recorded on inner and outer tracks and the speed of revolution is maintained at 1800 rpm at both innermost and outermost tracks when the video and audio information is detected by an optical pickup. In the CAV system, since a horizontal synchronizing signal and a color burst synchronizing signal are arranged coaxially the horizontal synchronization agrees with the color burst synchronization and advantageously images are not destroyed even in the scan mode. But, both of the innermost and the outermost tracks should be recorded with the same amount of information, thereby resulting in wasted disk space.

The CLV system has been introduced to solve such problems. In the CLV system, the amount of information recorded in the outermost track is as much as three times more than that in the innermost track. The innermost track revolves at a speed of 1800 rpm, while the outermost one revolves at a speed of 600 rpm when the information stored on the laser disk is detected by the optical pickup.

FIG. 1 shows a circuit diagram of a conventional laser disk player employing the conventional CLV system. In FIG. 1, if a user presses a playback key (not shown in FIG. 1) for initially driving of a laser disk 1, a MICOM (microcomputer) 2 supplies power to a spindle motor 3 and a pickup driving servo system 4 for rotating a turntable 5 and locates an optical pickup 6 in the inner or outer track of the laser disk 1.

The location of the optical pickup 6 is determined by the starting point of the information, where a frequency generating sensor 7 detects rotational speed of the spindle motor 3 and provides such a sensed signal to a time-based controller 8. The time-based controller 8 recognizes the current rotational speed of the spindle motor 3 by this sensed signal and controls a spindle motor servo system 9 to maintain normal speed of the spindle motor 3. The time-based controller 8 is controlled by the sensed signal which is supplied from the frequency generation sensor 7 only during the initial driving of the spindle motor 3, while the time-based controller 8 is controlled by another signal which is supplied from an adder 16 in the next step if the speed of the spindle motor 3 is beyond a predetermined value.

Particularly, the spindle motor 3 revolves at the speed of 1800 rpm when the optical pickup 6 detects the information stored on the inner track of the laser disk 1, while revolving at the speed of 600 rpm when the optical pickup 6 detects the information stored on the outer track of the laser disk 1 so as to detect the information stored on the laser disk 1 safely. Next, audio and video signals detected by the optical pickup 6 are respectively provided to an audio processor 10 and a video processor 11, and they are applied to a speaker and a monitor (which are not shown in FIG. 1) after signal processing in the audio processor 10 and the video processor 11.

Subsequently, a horizontal synchronizing signal detector 12 separates a horizontal synchronizing signal out of the video signal which comes from the video processor 11, while a color burst synchronizing signal detector 13 separates a color burst synchronizing signal in the burst signal interval of the video signal. Then, the horizontal synchronizing signal is compared with a reference horizontal synchronizing signal of 15.734 KHz in a horizontal synchronizing error detector 14. The color burst synchronizing signal is also compared with a reference color burst synchronizing signal of 3.58 MHz in a color burst synchronizing error detector 15. The error signals which are provided from the horizontal and color burst synchronizing error detectors 14 and 15 are added by the adder 16 and the output of the adder 16 is provided to the time-based controller 8. Then, the time-based controller 8 controls the speed of the spindle motor 3 in response to the summed error signal which is provided from the adder 16. Thus, the spindle motor 3 can maintain the constant speed, so that the optical pickup 6 can accurately detect the information stored on the laser disk 1.

In this CLV system, if a user presses scan switches SCAN+ or SCAN− of the MICOM 2 for scan mode, the MICOM 2 not only rotates the spindle motor 3 at a constant speed, but also radially moves the optical pickup 6 to the inner or outer side of the laser disk 1 to execute the scan mode. In the CLV system, however, the horizontal synchronizing signals are not arranged in one line on the laser disk 1 since the amount of the information on the outer side of the laser disk 1 is as much as about three times more than that on the inner side.

In the scan mode, therefore, the synchronization of video signals to be displayed on a screen do not agree with each other, so the video signal is not displayed on the screen. In order to solve this problem, random access memories are employed. In other words, the random access memory, first, stores the information corresponding to one field of the video signal and next applies the information to the monitor to prevent the non-displaying mode on the screen. But, this method is not practical since the cost of the random access memory is very expensive. In addition, images on the screen are not clear since the video signal corresponding to only one field is applied to the monitor.

SUMMARY OF THE INVENTION

An object of the present invention is to provide a synchronization holding circuit for scanning within a laser disk player which displays a predetermined color signal on the monitor until the color burst and horizontal synchronizing signals are respectively synchronized by stopping the optical pickup after holding the scan mode for a predetermined time period in the CLV system, and provides the video signals to the monitor only when the color burst and horizontal synchronizing signals agree with each other so that the video signal does not appear on the screen, thereby preventing user eyestrain.

According to the present invention, there is provided a synchronization holding circuit used in scanning of a laser disk in a laser disk player, comprising: a signal detection circuit for detecting audio and video signals by moving an optical pickup according to the control of a micom; a signal processing circuit connected to the signal detection circuit for processing the detected audio and video signals; an error detection circuit connected to the signal processing circuit for detecting the errors of the audio and video signals provided from the signal processing circuit; a speed control circuit connected to the error detection circuit for controlling the speed of the laser disk with respect to the output of the error detection circuit; a locking detection circuit connected to the signal processing circuit for providing a locking signal when horizontal and phase synchronous signals of the video signal agree with respective reference signals within a predetermined range in the scan mode, the MICOM being connected to the locking detection circuit for moving the optical pickup for a predetermined time and for stopping the optical pickup after the predetermined time so as to provide a switching signal in accordance with the locking signal or in accordance with stop or pause mode; and a switching circuit located between the MICOM and the signal processing circuit for providing the video signals or color-back signals according to the switching signal of the MICOM.

BRIEF DESCRIPTION OF DRAWINGS

These and other objects, features, and advantages of the present invention will become more apparent from the following description for the preferred embodiments taken in conjunction with the accompanying drawings, in which.

DETAILED DESCRIPTION OF THE PREFERRED EMBODIMENT

The present invention will be now described in more detail with reference to the accompanying drawings.

Figure 1:
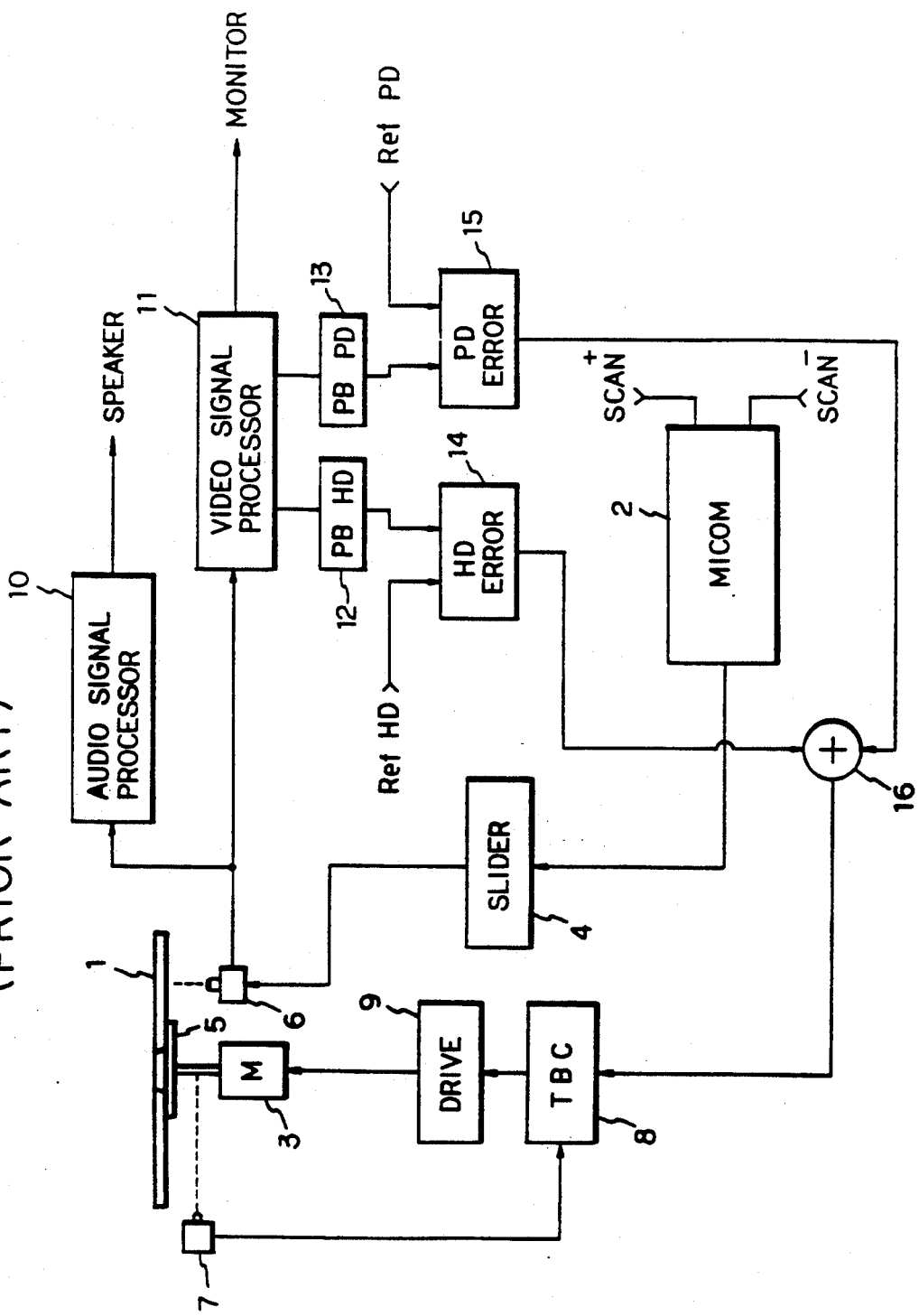
FIG. 1 is a circuit diagram of a conventional laser disk player employing a conventional CLV system.
Figure 2:
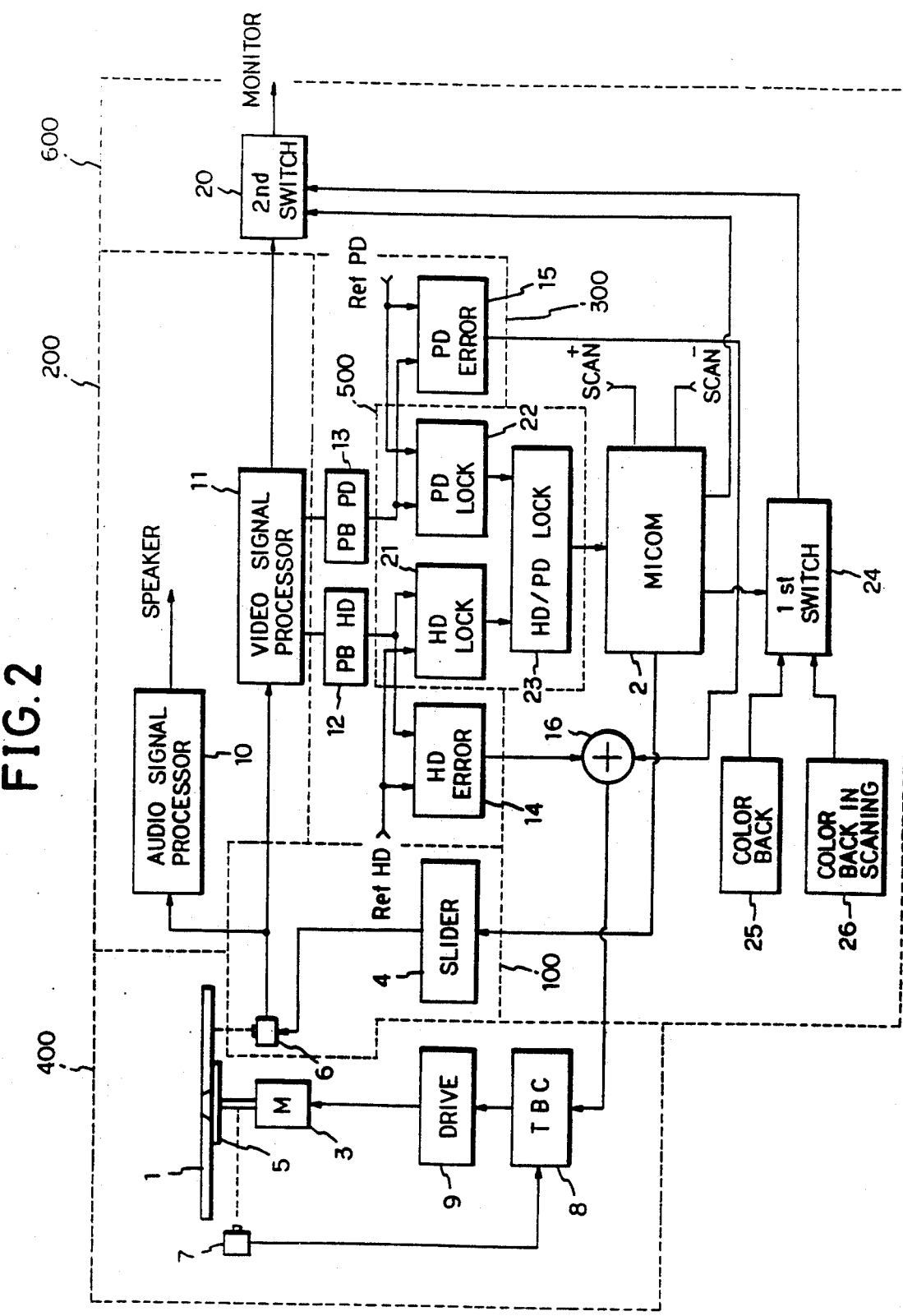
FIG. 2 is a circuit diagram of a synchronization holding circuit in scanning of a laser disk player according to the present invention.

FIG. 2 shows a synchronization holding circuit used in a scan mode of a laser disk player according to the present invention. In FIG. 2, the synchronization holding circuit includes a signal detection circuit 100, a signal processing circuit 200, an error detection circuit 300, a speed control circuit 400, a locking detection circuit 500, and a switching circuit 600, where the signal detection circuit 100, signal processing circuit 200, error detection circuit 300, and speed control circuit 400 are similar to those of the conventional one.

To describe in more detail, the signal detection circuit 100 is to detect audio and video signals which are stored on a laser disk 1 and comprises an optical pickup 6 for detecting information of the laser disk 1 by an optical signal and a pickup driving servo system 4 connected to the optical pickup 6 for moving the optical pickup 6 at a constant speed on a straight line under the control of a MICOM 2.

The signal processing circuit 200 connected to the signal detector 100 for processing the audio and video signals comprises an audio processor 10 and a video processor 11 for processing video signals to be applied to the optic pickup 6. The error detection circuit 300 is to detect errors of the horizontal and color burst synchronizing signals of the video signals applied from the signal processor 100 and comprises horizontal and color burst synchronizing signal detectors 12 and 13 and horizontal and color burst synchronizing error detectors 14 and 15 respectively for comparing the horizontal and color burst synchronizing signals with their respective reference signals and providing their differences as error signals. The outputs of the horizontal and color burst synchronizing error detectors 14 and 15 are provided to an adder 16.

The speed control circuit 400 for controlling the rotation speed of the laser disk 1 comprises a turntable 5 for mounting the laser disk 1, a spindle motor 3, a frequency generation sensor 7 for generating a predetermined frequency corresponding to the rotation of a driving axis of the spindle motor 3, and a time-based controller 8. The output of the adder 16 in the error detection circuit 300 is applied to the time-based controller 8 and then the time-based controller 8 provides a control signal for an initial speed of the spindle motor 3 according to a frequency signal of the frequency generation sensor 7.

Therefore, if the speed of the spindle motor 3 reaches a predetermined value, the time-based controller 8 provides the control signal according to the output of the adder 16 instead of the frequency generation sensor 7. The speed control circuit 400 also includes a spindle motor servo system 9 for controlling the speed of the spindle motor 3 according to the control signal of the time-based controller 8.

The locking detection circuit 500 provides a locking signal when the horizontal and color burst synchronizing signals agree with their respective reference signals and comprises horizontal and color burst synchronizing signal locking detectors 21 and 22. In addition, the locking detection circuit 500 includes a locking signal detector 23 which operates as an AND gate only when the locking signals of the horizontal and color burst synchronizing signal locking detectors 21 and 22 are applied simultaneously. Next, the locking detection circuit 500 is connected to the MICOM 2 which moves or stops the optical pickup 6 in normal or scan modes and provides a switching signal according to the locking signal or a stop or pause mode of the laser disk 1.

The MICOM 2 is connected to a switching circuit 600 for providing the video signals or color-back signal of the signals processing circuit 200 according to the switching signal of the MICOM 2. The switching circuit 600 comprises first and second switches 24 and 20, first and second color signal generators 25 and 26. The first switch 24 is usually not connected to the first and second color signal generators 25 and 26 respectively, but when the MICOM 2 provides a switching signal, the switch 24 is electrically connected to the first or second color signal generator 25 or 26 respectively. The first color signal generator 25 displays a bright color in the stop or pause modes and the second color signal generator 26 displays a dark color in the scan mode. In the switching circuit 600, the first switch 24, the MICOM 2, and the video signal processor 11 are connected to the second switch 20. The second switch 20 is to provide either the output of the video signal processor 11 or the output of the first switch 24 to a monitor (not shown in FIG. 2) according to the switching control signal of the MICOM 2.

According to this invention constructed as above, the synchronization holding circuit of the laser disk player normally operates similarly to the conventional one. To describe in more detail, the optical pickup 6 detects the information stored on the laser disk 1 and provides them to the signal processing circuit 200 according to the control of the MICOM 2, moving at a constant speed when the laser disk 1 rotates. The signal detected by the optical pickup 6 is processed in the audio processor 10 and the video processor 11. The audio signal processed by the audio processor 10 is provided to a speaker and the video signal processed by the video processor 11 is provided to the second switch 20, where the second switch 20 is connected to the video signal processor 11 and provides the video signal to the monitor, since scan keys SCAN+ and SCAN− of the MICOM 2 are not activated. On the other hand, the error of the horizontal and color burst synchronizing signals out of the video signal are detected by the error detection circuit 300 and the detected errors are applied to the speed control circuit 400. Thus, the speed control circuit 400 controls the spindle motor 3 and maintains the predetermined rotation speed.

If the user wants to execute the scan modes of the laser disk player, then the user presses the scan keys SCAN+ or SCAN− which are connected to the MICOM 2. The MICOM 2 moves the optical pickup 6 outwardly or inwardly on the laser disk 1 in response to activating the scan key SCAN+ or SCAN−. However, if the optical pickup 6 is continuously moved as mentioned above, the synchronizing signals will no longer stay in phase with each other. In the case of the CLV system, system the video signal will not be displayed on the screen.

However, the circuit according to the present invention provides the output of the video processor 11 to the monitor through the second switch 20 only when the horizontal and color burst synchronizing signals are identified with each other in such a manner that the video signal appears on the screen only when the optical pickup 6 is moved for a constant time for scan mode and subsequently stopped according to the control of the MICOM 2, as follows:

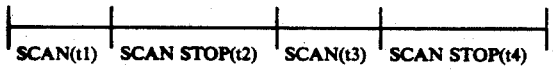

In the scan mode, the MICOM 2 controls the first switch 24 to be connected to either the first color signal generator 25 or the second color signal generator 26, since the video signals detected by the optical pickup 6 for a scan time t1 when the optical pickup 6 is moving are not synchronized and thus the video signal appears on the screen. Also, the MICOM 2 controls the first switch 24 to be connected to the second switch 20 so that the predetermined color signal is displayed on the monitor and the user becomes free from the eyestrain caused by the non-display phenomenon of the screen.

The MICOM 2 stops the optical pickup 6 after completion of the scan time t1 and subsequently detects the synchronization of the horizontal and color burst synchronizing signals of the displayed video signal. Since the laser disk 1 continuously rotates and the optical pickup 6 stops, the horizontal and color burst synchronizing signals are synchronized with each other at a certain point in time when the displayed video signal is detected. Judgement as to whether the horizontal and color burst synchronizing signals are synchronized or not is determined by comparing the outputs of the horizontal and color burst synchronizing signal detector 12 and 13 with respective reference signals in the horizontal and color burst synchronizing signal locking detectors 21 and 22 respectively.

If the horizontal and color burst synchronizing signals are within a predetermined range of the reference signals, respectively, the horizontal and color burst synchronizing signal locking detectors 21 and 22 respectively provide locking signals. Next, the locking signal detector 23 determines whether the locking signals of the horizontal and color burst synchronizing signal locking detectors 21 and 22 respectively are provided at the same time or not, so that if the locking signals are provided at the same time, the locking signal detector 23 provides a final locking signal. Thus, the final locking signal is provided when the horizontal and color burst synchronizing signals are synchronized with the reference signals, that is, the video signal is displayed on the screen.

The MICOM 2 which receives this locking signal, then, controls the first switch 24 to disconnect both the first and second color signal generators 25 and 26 respectively. Even though the first switch 24 is connected to the first and second color signal generators 25 and 26 respectively, the mode of the present invention is not changed. Also, the MICOM 2 controls the second switch 20 to connect to the video processor 11, so that the video signal on the screen is provided to the monitor, so that the user can watch the screen in the scan mode.

By repeating this step, the monitor displays a predetermined color of the first or second color signal generator 25 or 26 respectively when the video signal recorded on the laser disk 1 can no longer be read, while the monitor displays the video signal when they can be read from the laser disk 1 and the horizontal and color burst synchronizing signals agree with the reference signals respectively so that the video signal is provided clearly to the user.

On the other hand, when the laser disk player is in the stop or pause mode, the MICOM 2 controls the first and second switches 20 and 24 respectively so that the predetermined color outputs of the first or second color signal generators 25 or 26 respectively are supplied to the monitor, thereby protecting the eyes of the user from the eyestrain. At this time, the output color of the first color signal generator 25 may be bright, while that of the second color signal generator 26 is dark. The bright color is displayed in the stop or pause modes, while the dark color is displayed in the scan mode, so that the eyes of the user can be protected.

As mentioned up to now, the present invention protects the eyes of the user and informs the user of the scanning position of the currently scanned laser disk by displaying the video signal on the monitor only when the video signal is synchronized, while displaying the predetermined color signal provided from the color signal generator on the monitor when the video signal disappears due to the lack of synchronization of the video signal to provide the clear screen to the user.

The present invention is in no way limited to the embodiment described hereinabove. Various modifications of the disclosed embodiment as well as other embodiments of the invention will become apparent to persons skilled in the art upon reference to the description of the invention. It is, therefore, contemplated that the appended claims will cover any such modifications or embodiments as fall within the true scope of the present invention.

What is claimed is:

1. A synchronization holding circuit comprising:
   means responsive to a microcomputer for detecting audio and video signals from an optical pickup and generating detected audio and video signals;
   means for processing the detected audio and video signals and generating processed audio and video signals;
   means for detecting errors of the processed video signal and generating an error signal;
   means responsive to the error signal for controlling rotational speed of a laser disk;
   means for generating a locking signal when a degree of synchronization between a horizontal and color burst synchronizing signal of the processed video signal and a referenced horizontal and color burst synchronizing signal respectively is within a predetermined range;
   the microcomputer responsive to the locking signal or stop or pause mode signals and controlling movement of the optical pickup and generating a switching signal; and
   means responsive to the switching signal for displaying the processed video signal or a predetermined video color pattern.

2. A synchronization holding circuit as in claim 1, wherein the means for generating a locking signal comprises:
   means for determining a degree of synchronization between the horizontal synchronizing signal of the processed video signal and the reference horizontal synchronizing signal and generating a horizontal locking signal when the degree of synchronization is within a predetermined range;
   means for determining a degree of synchronization between the color burst synchronizing signal of the processed video signal and the reference color burst synchronizing signal and generating a color burst locking signal when a degree of synchronization is within a predetermined range;
   means responsive to the horizontal and color burst locking signals for generating the locking signal.

3. A synchronization holding circuit as in claim 1, wherein the means responsive to the switching signal comprises:
   means for generating a first predetermined color signal;
   means for generating a second predetermined color signal;
   means for selecting between the first and second predetermined color signals and generating a selected color signal;
   means responsive to the microcomputer for selecting between the selected color signal and the predetermined color pattern.

* * * * *